(12) United States Patent
Chen et al.

(10) Patent No.: US 10,974,488 B2
(45) Date of Patent: Apr. 13, 2021

(54) ENGINEERED PLANK AND ITS MANUFACTURING METHOD

(71) Applicant: Wellmade Floor Covering Int'l Inc., Wilsonville, OR (US)

(72) Inventors: Ming Chen, Wilsonville, OR (US); Zhu Chen, Jiangsu (CN)

(73) Assignee: WELLMADE FLOOR COVERING INT'L INC., Wilsonville, OR (US)

( * ) Notice: Subject to any disclaimer, the term of this patent is extended or adjusted under 35 U.S.C. 154(b) by 365 days.

(21) Appl. No.: 15/596,175

(22) Filed: May 16, 2017

(65) Prior Publication Data

US 2017/0246845 A1 Aug. 31, 2017

Related U.S. Application Data

(63) Continuation-in-part of application No. 15/354,674, filed on Nov. 17, 2016, now abandoned, which is a
(Continued)

(30) Foreign Application Priority Data

Nov. 17, 2015 (CN) .......................... 201510794065.2
Nov. 17, 2015 (CN) .......................... 201510794113.8
(Continued)

(51) Int. Cl.
*B32B 27/08* (2006.01)
*B32B 27/20* (2006.01)
(Continued)

(52) U.S. Cl.
CPC .............. *B32B 27/08* (2013.01); *B32B 9/002* (2013.01); *B32B 9/005* (2013.01); *B32B 9/045* (2013.01);
(Continued)

(58) Field of Classification Search
CPC ....... B32B 27/08; B32B 27/304; B32B 27/12; B32B 27/10; B32B 9/005; B32B 9/045;
(Continued)

(56) References Cited

U.S. PATENT DOCUMENTS 3,849,174 A 11/1974 Ancker
5,356,705 A 10/1994 Kelch et al.
(Continued)

FOREIGN PATENT DOCUMENTS

CN 101590695 A 12/2009
CN 102501506 A 6/2012
(Continued)

OTHER PUBLICATIONS

Machine translation of JP 06-055967. (Year: 1994).*
(Continued)

*Primary Examiner* — John D Freeman
(74) *Attorney, Agent, or Firm* — Thompson Coburn LLP

(57) ABSTRACT

A plank is described and a method for manufacturing the plank. The plank can be produced by mixing polyvinyl chloride powder, coarse whiting and light calcium compound powder, stabilizer, polyethylene wax, internal lubricant, plasticizer, and impact modifier together, and stirring this mixture. The mixture is then extruded through an extruder compound to form a plastic composite base material. A surface layer is then tiled onto the plastic composite base material using thermal compression, without the use of intermediate adhesive materials. The surface layer can be embossed when it is combined with the mixture being extruded.

20 Claims, 14 Drawing Sheets

Related U.S. Application Data continuation-in-part of application No. 15/145,667, filed on May 3, 2016, now abandoned, which is a continuation of application No. 14/997,965, filed on Jan. 18, 2016, now abandoned.

(30) Foreign Application Priority Data

| Nov. 17, 2015 | (CN) | 201520919804.1 |
|---|---|---|
| Nov. 17, 2015 | (CN) | 201520919986.2 |

(51) Int. Cl.

| B32B 27/22 | (2006.01) |
|---|---|
| B32B 27/30 | (2006.01) |
| E04F 15/10 | (2006.01) |
| B32B 27/06 | (2006.01) |
| B32B 27/12 | (2006.01) |
| B32B 27/10 | (2006.01) |
| B32B 9/00 | (2006.01) |
| B32B 9/04 | (2006.01) |
| B32B 15/082 | (2006.01) |
| B32B 25/08 | (2006.01) |
| B32B 21/08 | (2006.01) |

(52) U.S. Cl.
CPC ............ *B32B 15/082* (2013.01); *B32B 21/08* (2013.01); *B32B 25/08* (2013.01); *B32B 27/06* (2013.01); *B32B 27/10* (2013.01); *B32B 27/12* (2013.01); *B32B 27/20* (2013.01); *B32B 27/22* (2013.01); *B32B 27/304* (2013.01); *E04F 15/105* (2013.01); *E04F 15/107* (2013.01); B32B 2250/02 (2013.01); B32B 2250/03 (2013.01); B32B 2250/04 (2013.01); B32B 2250/24 (2013.01); B32B 2264/104 (2013.01); B32B 2307/538 (2013.01); B32B 2307/54 (2013.01); B32B 2307/72 (2013.01); B32B 2307/734 (2013.01); B32B 2419/00 (2013.01); B32B 2419/04 (2013.01)

(58) Field of Classification Search
CPC ....... B32B 9/002; B32B 15/082; B32B 25/08; B32B 21/08; B32B 27/06; B32B 27/20; B32B 27/22; B32B 2250/24; B32B 2250/04; B32B 230/734; B32B 2250/03; B32B 2419/00; B32B 2250/02; B32B 2264/104; B32B 2307/72; B32B 2307/538; B32B 2307/54; B32B 2419/04; B32B 9/025; B32B 17/00; E04F 15/105; E04F 15/107; E04F 15/102
See application file for complete search history.

(56) References Cited

U.S. PATENT DOCUMENTS

| 5,424,363 | A | 6/1995 | Nagata et al. |
|---|---|---|---|
| 6,444,075 | B1 | 9/2002 | Schneider et al. |
| 2001/0049242 | A1 | 12/2001 | Soininen et al. |
| 2010/0247861 | A1 | 9/2010 | Mitchell |
| 2011/0207870 | A1 | 8/2011 | Bussels et al. |
| 2011/0293914 | A1 | 12/2011 | Maurer et al. |
| 2013/0230687 | A1 | 9/2013 | Chen |
| 2015/0114552 | A1 | 4/2015 | Cernohous et al. |
| 2015/0273804 | A1 | 10/2015 | Haixing |
| 2017/0001421 | A1* | 1/2017 | Dai ..................... B32B 27/20 |
| 2017/0183878 | A1* | 6/2017 | Zhang ................. B29C 43/003 |
| 2019/0040635 | A1* | 2/2019 | Baert ..................... B32B 37/04 |

FOREIGN PATENT DOCUMENTS

| CN | 103232651 | A | * | 8/2013 | |
|---|---|---|---|---|---|
| CN | 104924370 | A | | 9/2015 | |
| CN | 105295256 | A | | 2/2016 | |
| CN | 105328954 | A | | 2/2016 | |
| CN | 205134872 | U | | 4/2016 | |
| CN | 205171925 | U | | 4/2016 | |
| CN | 105625674 | A | | 6/2016 | |
| CN | 105649298 | A | | 6/2016 | |
| GB | 1104793 | A | | 2/1968 | |
| GB | 1162171 | A | | 8/1969 | |
| JP | 06055967 | A | * | 3/1994 | |
| JP | H07314476 | A | | 12/1995 | |
| KR | 100679815 | B1 | | 1/2007 | |
| WO | 2015168610 | A1 | | 11/2015 | |
| WO | WO-2015170274 | A1 | * | 11/2015 | ............ E04F 15/105 |

OTHER PUBLICATIONS

Sika, "Product Data Sheet Sikafloor-Ò-420", Apr. 2017, site visited Jul. 11, 2018, <https://www.rawlinspaints.com/home/floor-paints/medium-use/2076-sikafloor-420.html>.
International Search Report and Written Opinion for PCT/US2018/031952 dated Aug. 23, 2018.
Chen et al., "An Engineered Plank and Its Manufacturing Method", U.S. Appl. No. 15/145,667, filed May 3, 2016.
Chen et al., "Engineered Plank and Its Manufacturing Method", U.S. Appl. No. 15/354,674, filed Nov. 17, 2016.
International Search Report and Written Report for PCT/US2016/062614 dated Jan. 24, 2017.
Office Action for U.S. Appl. No. 15/145,667 dated Jul. 18, 2016.
Office Action for U.S. Appl. No. 15/145,667 dated May 3, 2016.
Office Action dated Jul. 15, 2016, U.S. Appl. No. 14/997,965, filed Jan. 18, 2016, 12 pages.

* cited by examiner

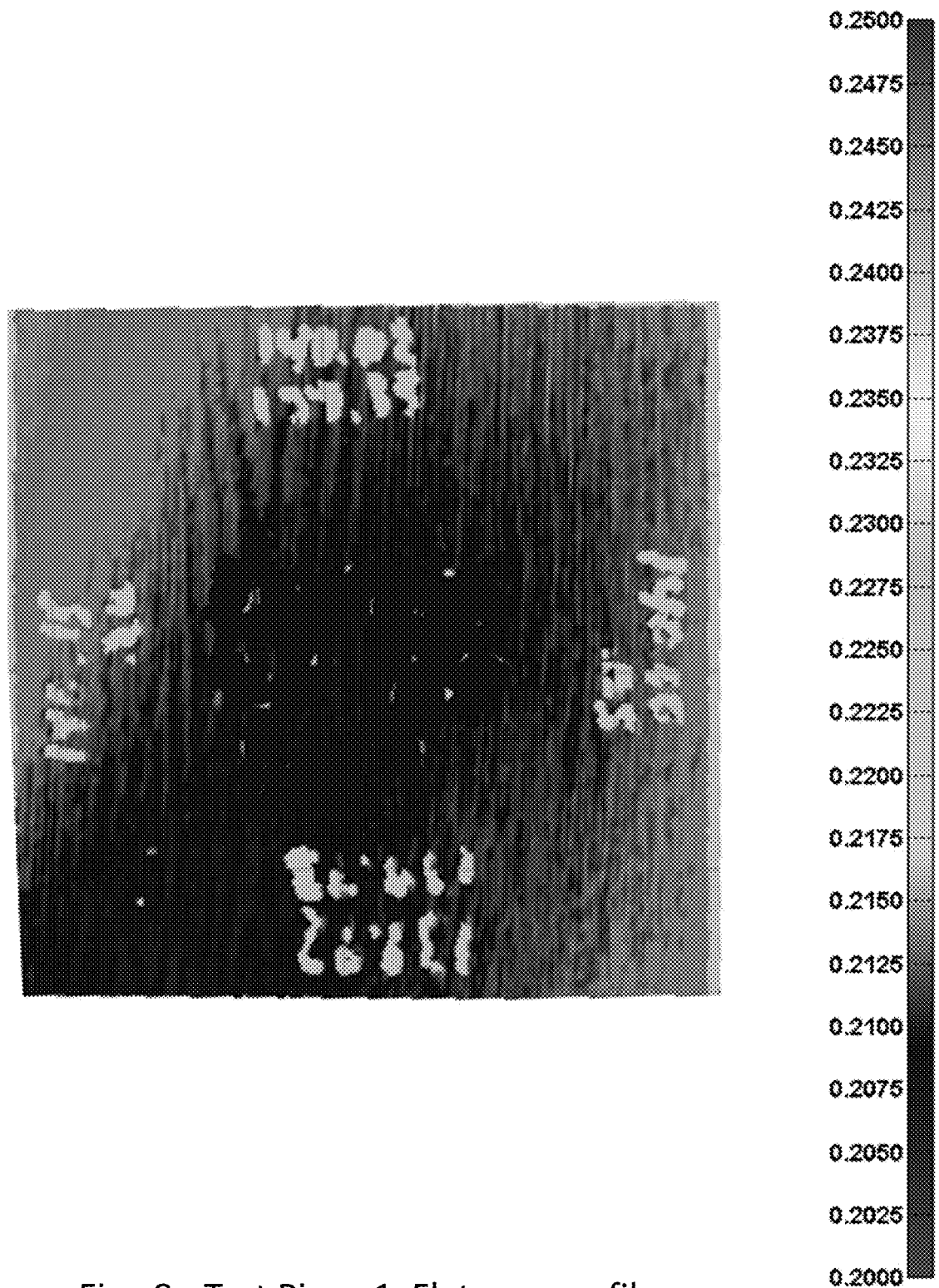
Fig. 8 - Test Piece 1 Flatness profile

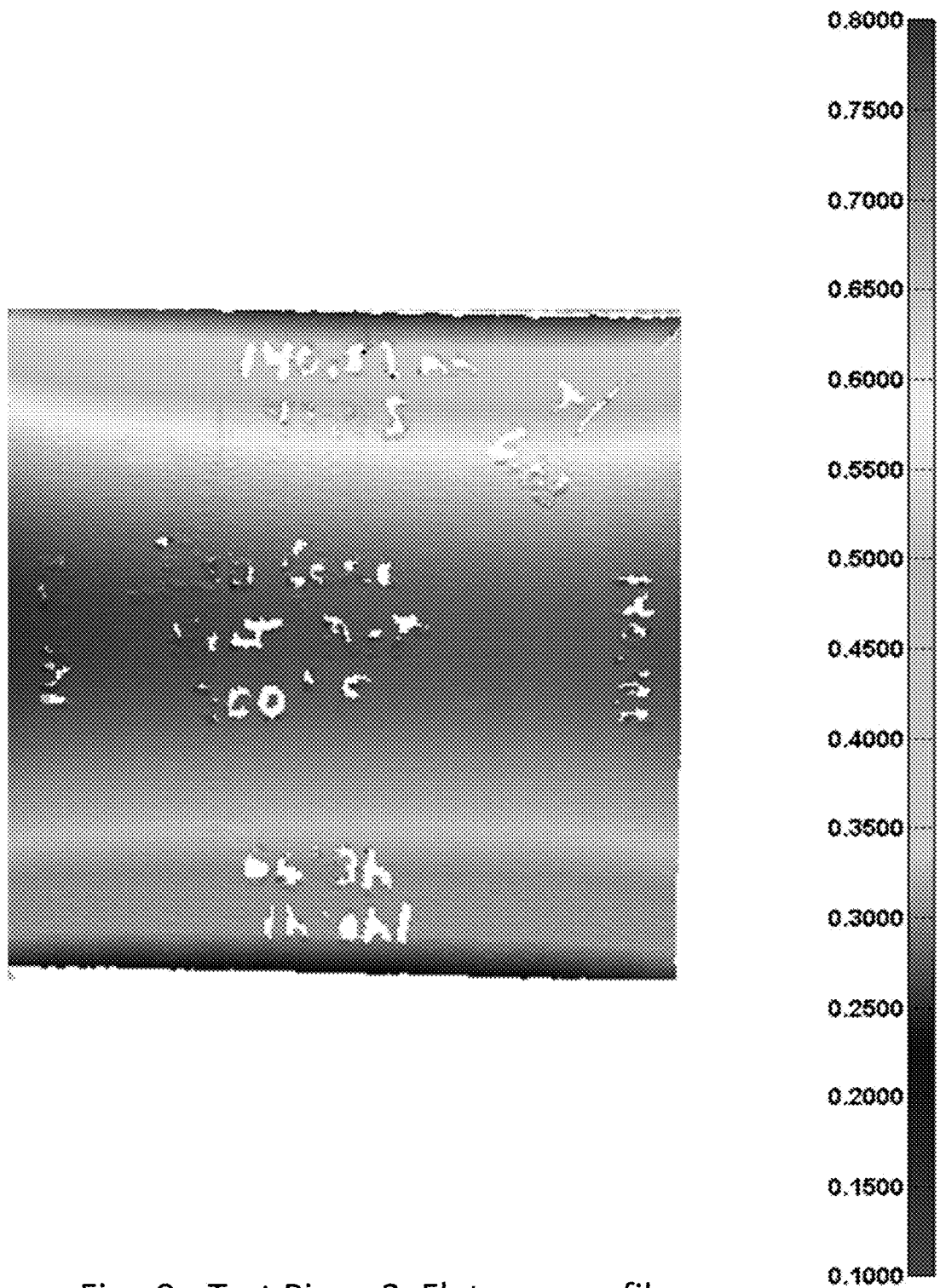
Fig. 9 - Test Piece 2 Flatness profile

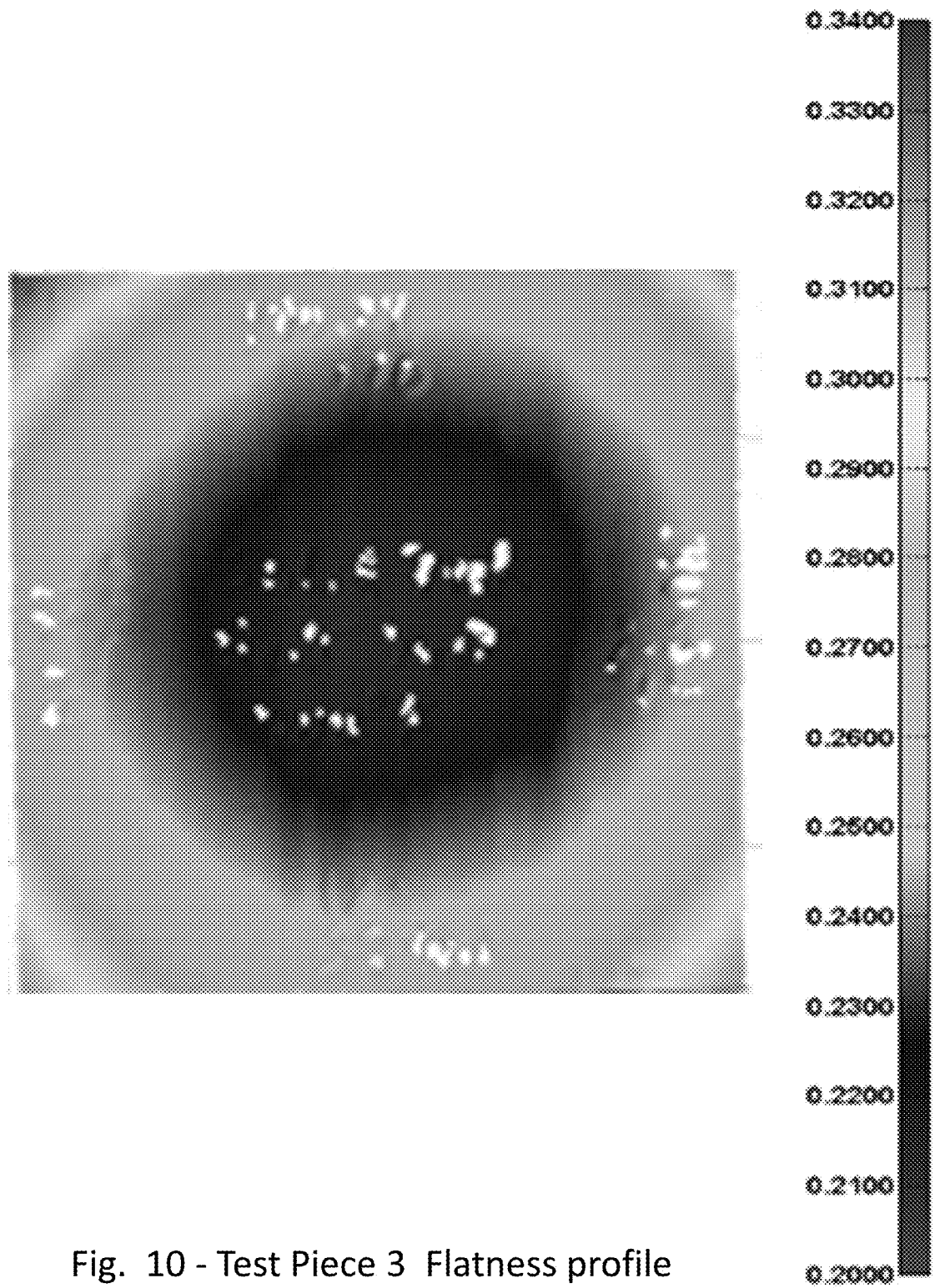
Fig. 10 - Test Piece 3 Flatness profile

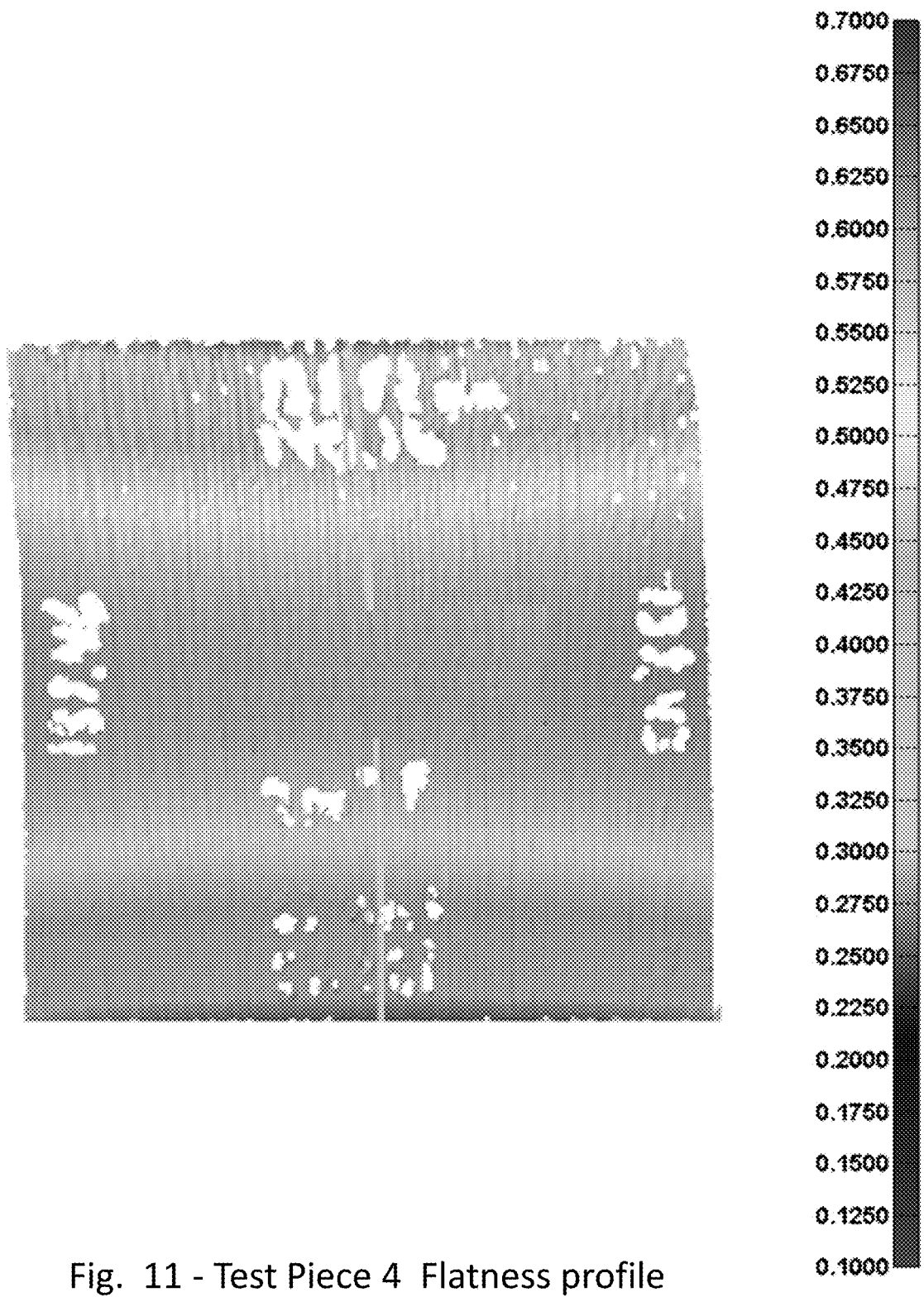
Fig. 11 - Test Piece 4 Flatness profile

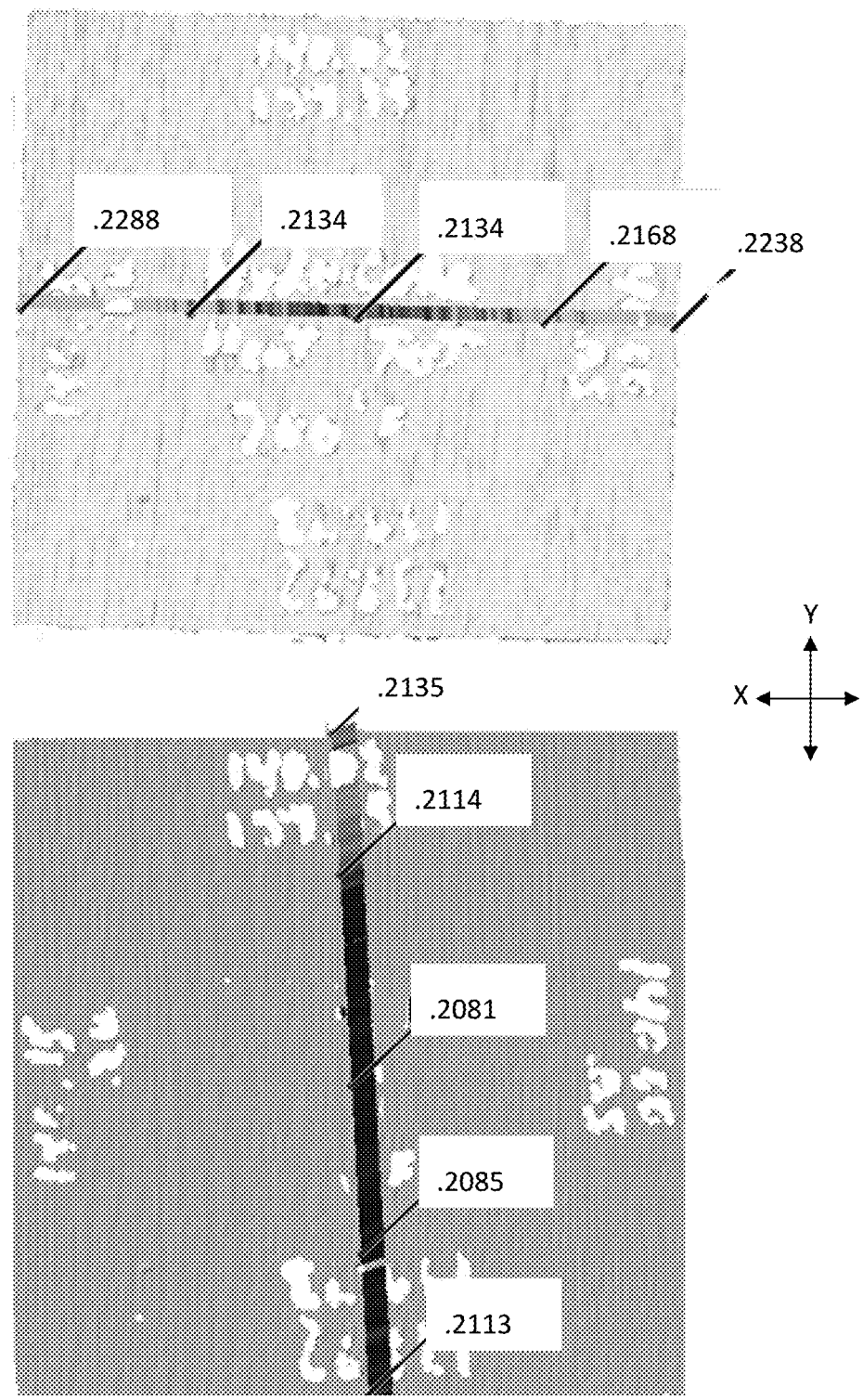
Fig. 12 - Test Piece 1 Flatness profiles

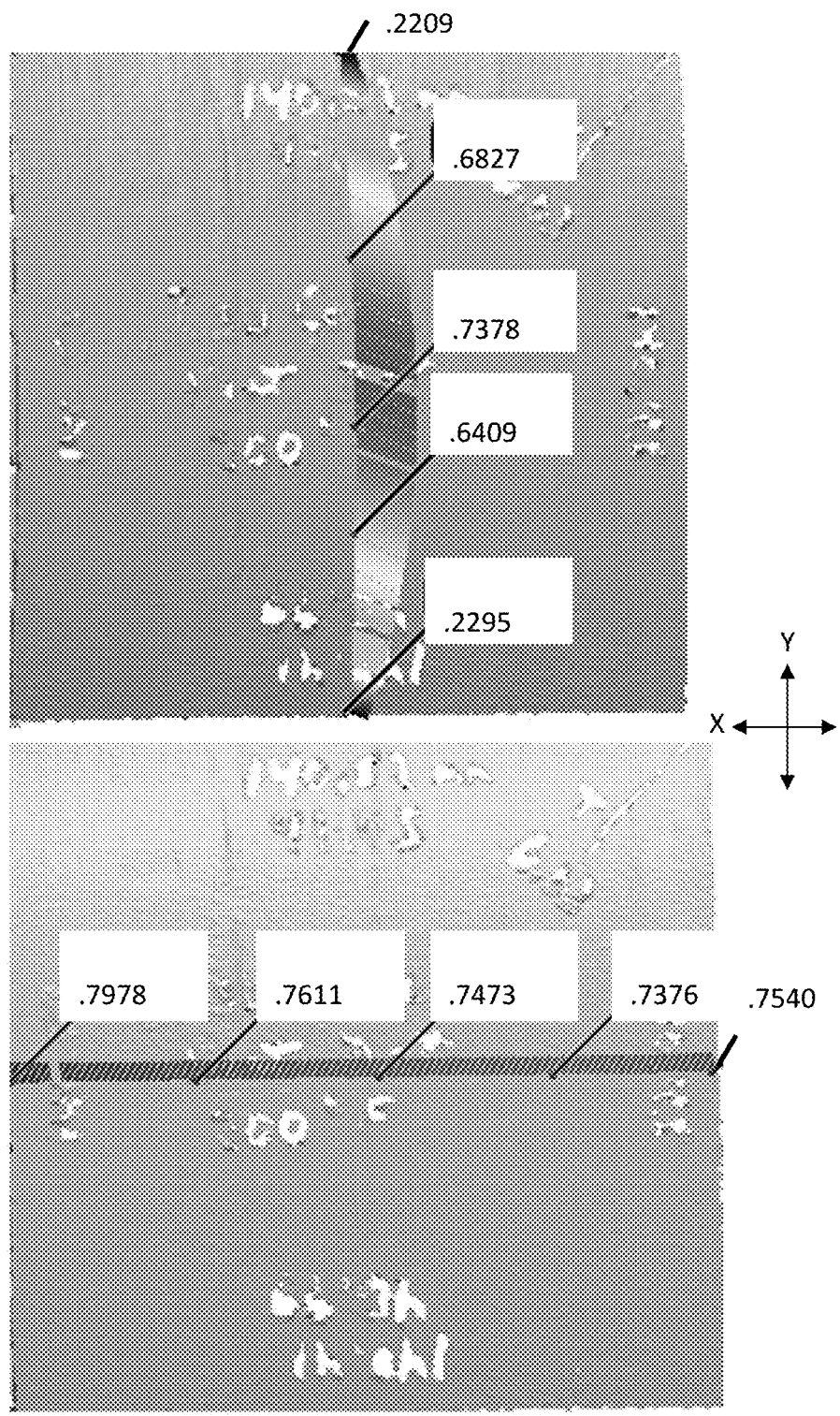
Fig. 13 - Test Piece 2 Flatness profiles

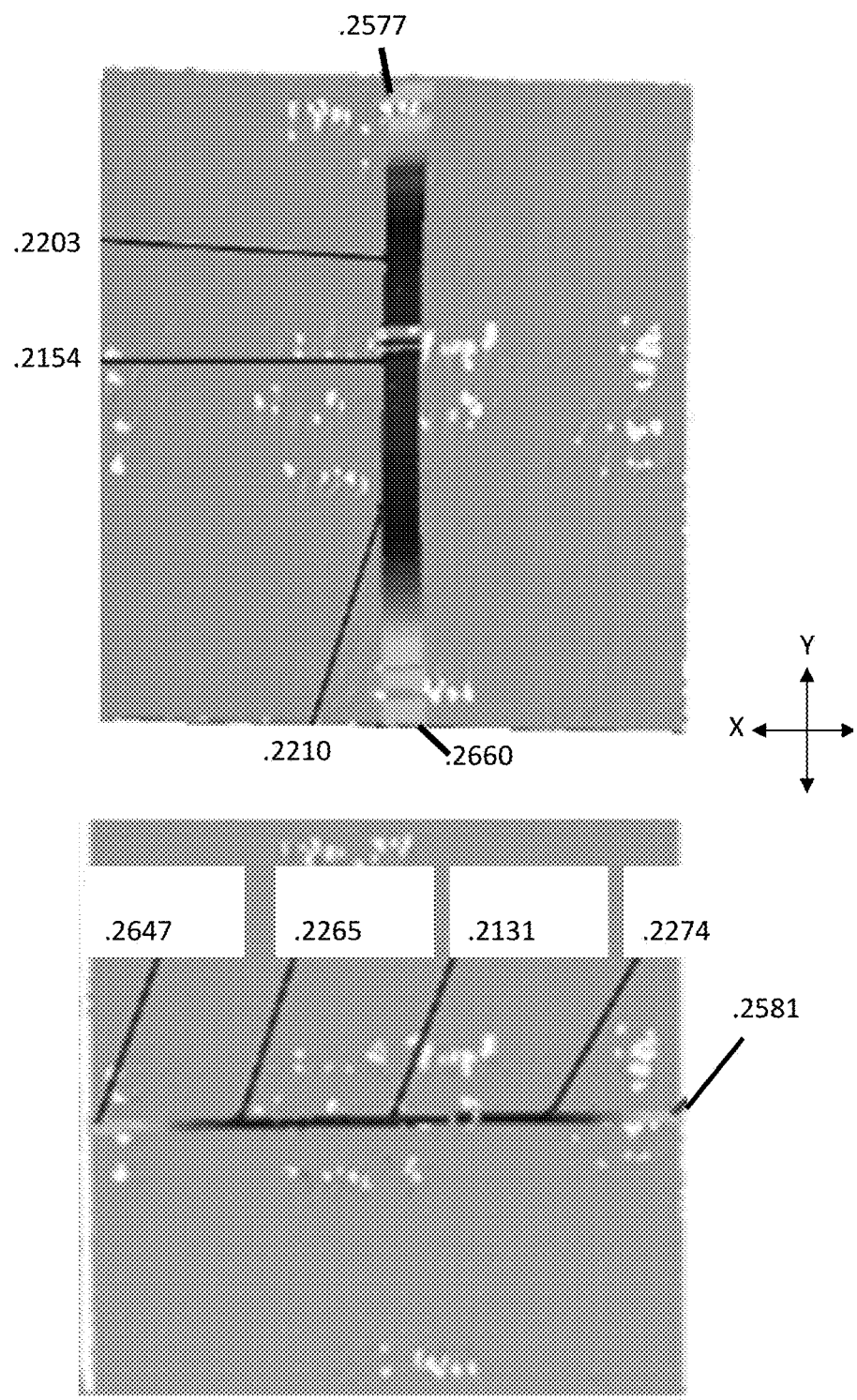
Fig. 14 - Test Piece 3 Flatness profiles

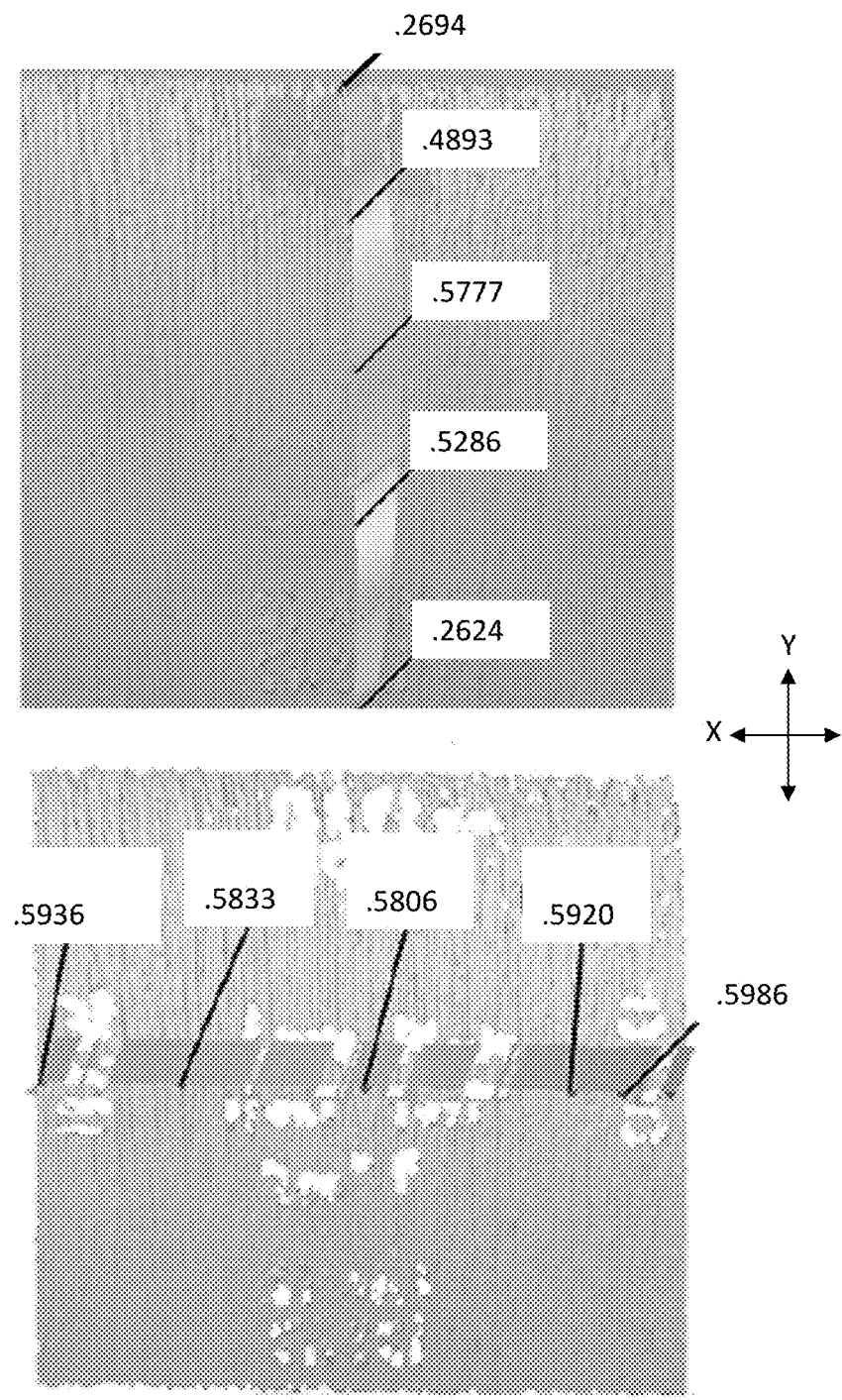
Fig. 15 - Test Piece 4 Flatness profiles

ENGINEERED PLANK AND ITS MANUFACTURING METHOD

RELATED APPLICATION DATA

The present application is a continuation-in-part of U.S. patent application Ser. No. 15/354,674, filed Nov. 17, 2016, currently pending which is a continuation-in-part of U.S. patent application Ser. No. 15/145,667, filed May 3, 2016, which is a continuation of U.S. patent application Ser. No. 14/997,965, filed Jan. 18, 2016, currently pending, which claims priority from one or more of the following: Chinese Patent Appl. No. 201510794065.2, filed Nov. 17, 2015 and entitled "Flooring with Fastener"; Chinese Patent Appl. No. 201510794113.8, filed Nov. 17, 2015 and entitled "Flooring with Fastener"; Chinese Patent Appl. No. 201520919804.1, filed Nov. 17, 2015 and entitled "Flooring with Fastener"; and Chinese Patent Appl. No. 201520919986.2, filed Nov. 17, 2015 and entitled "Flooring with Fastener", the entire disclosures of the application recited above are hereby incorporated by reference, as if set forth in full in this document, for all purposes.

BACKGROUND

The invention relates to building materials, predominantly flooring, especially involving an engineered plank and its production method. In a common approach to constructing flooring planks that have some plastic content, a substrate is extruded and then a surface layer is glued to the substrate. Typically, to create a desired look, the surface layer is a composite layer comprising a printed paper sheet glued to a wear layer. Then, to make a flooring plank, after gluing the wear layer and the drawing paper to form the surface layer and extruding and forming the substrate, these are compressed and pasted together.

Flooring planks are commonly made using wood or wood byproducts. For example, wood-plastic composite (WPC) engineered planks have a composite substrate having different layers of different materials that are in turn glued together to form the substrate. For example, a WPC plank might be constructed by extruding a wood polymer composite skin, extruding a low-density polymer core layer and gluing the skin and the core layer to form the substrate, and then gluing the surface layer to the substrate. This is often needed to increase the plank's rigidity.

In a typical construction process, the substrate, whether it is a single-layer substrate or a multi-layer substrate, is cut into slabs, such as 4 foot by 8 foot slabs, as is the surface layer. These are then aligned, glued, and with a high-pressure press, are pressed together.

The slabs might then be further cut and suitable edge connectors cut into the edges. A slab or plank can be constructed from a core that is adhered to a wear layer and possibly other layers using adhesive. A wear layer might be made separate from the substrate and later adhered with a waterproof adhesive.

The WPC substrate uses wood powder, which can result in a waste of resources, as it can affect the finish of the goods or create mustiness. WPC flooring planks might also require a coating process, which may increase the required number of processing steps and may make continuous production more difficult.

Therefore, improved engineered planks and improved methods for manufacturing engineered planks may be desired.

SUMMARY

In embodiments, an improved engineered plank is provided that overcomes some of the shortcomings of existing WPC and vinyl plank technologies. A plank is described and a method for manufacturing the plank. The plank can be produced by mixing polyvinyl chloride powder, coarse whiting and light calcium compound powder, stabilizer, polyethylene wax, internal lubricant, plasticizer, and impact modifier together, and stirring or blending this mixture. The mixture is then extruded through an extruder compound to form a plastic composite base material. A surface layer is then fused onto the plastic composite base material using thermal compression, without the use of intermediate adhesive materials.

In some embodiments, a core of the plank is High Density Plastic Composite (HDPC) and can have a density of around 1.9 tons/m$^3$ (tons per cubic meter). The plank has a rigid core construction and uses no glue or binders.

BRIEF DESCRIPTION OF THE DRAWINGS

FIG. 8 is a graph showing flatness of Test Sample 1.
FIG. 9 is a graph showing flatness of Test Sample 2.
FIG. 10 is a graph showing flatness of Test Sample 3.
FIG. 11 is a graph showing flatness of Test Sample 4.
FIG. 12 is a cross-sectional view of the flatness graph of Test Sample 1.
FIG. 13 is a cross-sectional view of the flatness graph of Test Sample 2.
FIG. 14 is a cross-sectional view of the flatness graph of Test Sample 3.
FIG. 15 is a cross-sectional view of the flatness graph of Test Sample 4.

DETAILED DESCRIPTION

Figure 1:
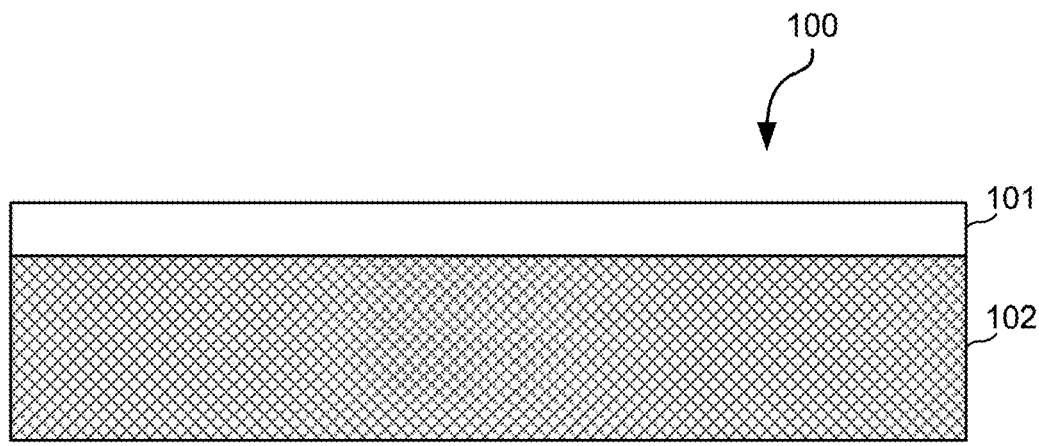
FIG. 1 is a diagram of a structure of an engineered plank.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein. The present disclosure provides additional detail to be read with the appended figures.

As described above, existing WPC flooring plank technology has a number of limitations. Accordingly, plank technology that addresses these limitations is desired. For example, it may be advantageous to construct a plank that does not use certain adhesive products, such as glue, and which do not use wood powder in the core.

These limitations may be overcome by using an engineered flooring plank using a High Density Plastic Composite (HDPC) or Rigid Core plank as described herein as the substrate. Such planks may allow for additional density and resistance to indentation when compared to existing WPC planks. For example, some WPC planks might have a density of 0.85 tons/m$^3$ while the HDPC has a density of 1.9 tons/m$^3$ or in a range of around that density, such as 1.7 to 2.1 tons/m$^3$. Additionally, manufacturing these planks may not require the use of any glue, which may lead to higher quality products, since a hot glue melt can result in an adhesive breakdown and may delaminate the plank. One technique used to create improved engineered floor planks may be referred to as a co-extrusion and a continuous-press process (CPP).

The substrate for the engineered planks is formed by heating the materials used to form the substrate and extruding the substrate, such as by using a three-calendar roller. The surface layer is applied to the substrate during extrusion such that the action of the extrusion compresses the surface layer and the substrate together. As the substrate is hot, the surface layer will adhere to the substrate without requiring glue. Where the surface layer and/or the substrate comprise more than one layer, those layers can be combined in the extrusion process.

The surface layer of such a plank may be constructed from many different types of materials, and can include one or more of ceramic, tile, glass, rubber, plastic, paper, leather, metal materials, stone, cloth, carpet, wood, and cork. Where the surface layer is amenable to being pressed through rollers, the surface layer can be pressed onto a hot plastic composite substrate using rollers. Wood surface layers might be thin enough and pliable enough, such as around 2 mm, to pass through the rollers. In the case of surface layers that are not amenable to an extrusion process, such as ceramic, tile, glass, etc., those surface layers might be applied just after the substrate has exited a last roller, but while the substrate is still hot enough to adhere to the surface layer. In any case, the flooring can be manufactured in a continuous process rather than having to be cut into slabs for further processing.

For some surface layers, it may use a material that is not waterproof, such as cork, paper, wood, etc., but these are typically decorative veneer. As such, there is less of a concern with expansion and contraction, as the plastic core is rigid enough that temperature and moisture changes would not significantly affect warping and the like. The surface layer can have a protective face layer to add wear resistance or stain resistance, with the core providing the rigidity and stability of the plank.

The substrate (comprising a plastic composite core and possibly also a plastic composite base material layer) may be extruded from a mixture of one or more of polyvinyl chloride (PVC) powder, coarse whiting and light calcium compound powder, stabilizer, polyethylene (PE) wax, internal lubricant, plasticizer, and impact modifier. For example, the substrate may be made using PVC powder, course whiting and light calcium powder, and stabilizer. The substrate may also be made without using light calcium powder. The materials of the substrate may be blended together, and then extruded. In some aspects, the substrate may be blended and extruded into two or more layers of plastic substrate. The plastic composite base material layer might be a layer on the floor-facing side of an HDPC substrate that adds slip resistance and gives enhanced sound properties. Some substrates might be made with no plasticizer component.

One method of producing an engineered plank as described herein includes the following steps:

Step 1: Mix PVC powder with coarse whiting and light calcium compound powder, stabilizer, PE wax, internal lubricant, plasticizer, and impact modifier by proportion of weight. Each of these components may be added in different quantities, or may be excluded as desired. This mixture may then be stirred. In some aspects, during the hot mixing process, the mixture temperature may be controlled to be approximately 110-120° C. For example, it may be desired to keep the mixture within 5, 10, 15, or 20° C. from 115° C. during this hot mixing process. Some subset of these components might be mixed in a cold mixing process prior to being mixed with the other components in the hot mixing process.

Step 2: Once the materials of the mixture are blended together, the mixture may then be extruded. The extruded product may be a compound which then forms the substrate. The product may be extruded using a number of different methods, such as using a three-roll calendar.

Step 3: A surface layer may then be pressed and fused onto the extruded plastic composite base material of the substrate. For example, this may be done using a three-roll calendar to bond the surface layer and the substrate together. In some aspects, each roll of the calendar may be kept at a specific temperature. For example, the first roll of the calendar may be kept at 130° C., or between 120 and 140° C., while the second roll is kept at 120° C., or between 110° C. and 130° C., and the third roll of the calendar may be kept at 110° C., or between 100° C. and 120° C. It should be understood that a calendar with less than or more than three rolls might also be used for this step, or other machines to bond the two layers together may also be used. In some aspects, controlled temperatures may be used when bonding the surface layer. For example, the temperature may be maintained to be between 150° C. and 200° C.

In some aspects, the surface layer may also be tiled onto the substrate material. Different scenarios may dictate different methods of applying a surface layer to substrate or base layers, depending on the materials used in the surface and other layers, as well as depending on the demands of a particular use for the resulting plank material. Instead of using glue, the surface layer is pressed to the core when the core is hot and that can result in the use of less volatile organic compounds (VOC's), reduce glue-based delamination concerns, reduce adhesive breakdown concerns, and speed production as it eliminates an extra step of gluing layers together.

Step 4: After this, the plank may be cooled, sized, and cut into the desired dimensions, based on the needs of the particular project or the plank design.

As described above, this engineered plank does not require the use of wood powder, which saves natural wood material. Thermal compression and bonding the surface layer and substrate using the temperature from the extrusion process can avoid the production of formaldehyde during production, by not using glue to press and paste the layers together. Further, it may be much easier to continuously produce the engineered planks described herein than it is to produce planks that include a glue coating process. This may make automated production possible, which may improve production efficiency, as well as enhance the stability of the adhesion between the layers of the engineered plank.

FIG. 1 illustrates an exemplary engineered flooring plank 100 according to some aspects of the present disclosure. As illustrated, engineered flooring plank 100 includes a surface layer 101 and a substrate 102. Surface layer 101 and substrate 102 are thermally compressed together. As described above, this technique avoids the use of glue and does not produce formaldehyde. Using a thermal compression process to securely attach or fuse surface layer 101 and substrate 102 together may also lead to production advantages over other techniques, such as allowing continuous production by reducing the glue coating process. Accordingly, engineered flooring plank 100 may be produced using more automated production, improving production efficiency and enhancing the stability of composite plate adhesion between surface layer 101 and substrate 102. The continuous production allows for the extrusion to be continuous so that the resulting plank material can be emitted from the rollers or other extrusion mechanism without requiring that it be cut into slabs for gluing.

Surface layer 101 may be made from materials such as ceramic, tile, glass, rubber plastic, paper, leather, metal materials, stone, cloth, carpet, cork and wood. Other materials may also be used, as desired. Patterned paper, not shown, may be added on top of surface layer 101 to create a desired appearance for the finished product. Instead of patterned paper with a pattern printed thereon, the desired appearance might be by a printed pattern printed on other than paper, but used in a similar manner. Direct printing on the substrate, such as with an inkjet printer, might be used as well instead of paper. Where needed, a wear layer, such as a PVC wear layer, can be applied over the surface layer, to protect against scuffing, scratching and wear through.

Substrate 102 is extruded out, and may be made from a mixture including one or more of PVC powder, coarse whiting and light calcium compound powder, stabilizer, PE wax, internal lubricant, plasticizer, and impact modifier. Substrate 102 may be a uniform mixture of two or more of the above components, such that it has a single texture, appearance, and physical properties. Some components might be omitted, such as the light calcium compound powder.

As described above, engineered flooring plank 100 may be produced by first mixing a number of components of substrate 102, such as PVC powder, coarse whiting and light calcium compound powder, stabilizer, PE wax, internal lubricant, plasticizer, and impact modifier by proportion of weight. This mixture may then be stirred in order to achieve an even consistency. In some aspects, the formula used for the surface layer may vary based upon the hardness and resistance to impact needs of a particular plank. Other technical requirements may also dictate the composition of surface layer 101. For example, the impact requirements of a project might dictate that surface layer 101 be made of materials that will provide a cushioning feature, such that the resulting flooring made from the planks might more easily absorb pressure from a person walking on the floor.

The mixture used to construct surface layer 101 includes both hot mixing and cold mixing. During hot mixing the temperature may be controlled to be between 110-120° C. The mixture may be fully mixed and stirred at this temperature. The mixture may then be cooled to 40-45° C. and continued to be stirred. After this, the mixture may be extruded through the extruder, which is a compound of plastic composite base material, like substrate 102. After this, surface layer 101 may be tiled onto the extruded substrate 102 in a fixed position. This may be done using a three-roll calendar to bond surface layer 101 and substrate 102 together. The material of substrate 102 is formed in a single step, which allows continuous automated production. The temperature of bonding surface layer 101 from the plastic composite material extrusion and the material of substrate 102 is controlled at around 150-200° C. The press roller of a multiple roll calendar can be used to design a concave and/or a convex mold, which may be used to form various types of designs on surface layer 101. These molds may be used to improve the aesthetics of surface layer 101, to increase friction on surface layer 101, or for other purposes. After this, the layers may be bonded, and engineered flooring plank 100 may be cooled, sized into the desired size, and then cut into shape.

Figure 2:
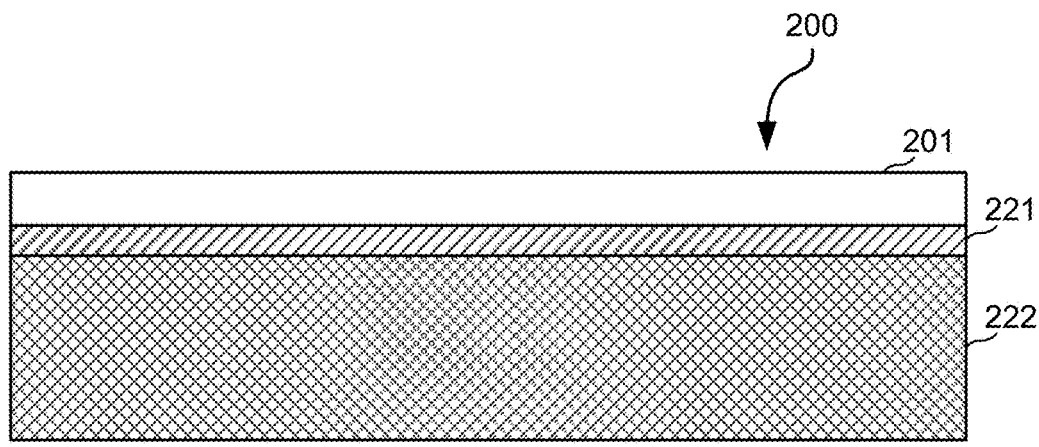
FIG. 2 is another diagram of a structure of an engineered plank.

FIG. 2 illustrates an exemplary plank 200 according to some aspects of the present disclosure, using a two-layer substrate. In plank 200, a surface layer 201 is thermally compressed together with the substrate. The surface layer 201 may be made from a large variety of different materials, depending on the needs of a particular project, a desired appearance, and desired surface layer characteristics. For example, the surface layer 201 may be constructed using one or more of ceramic, tile, glass, rubber, plastic, paper, leather, metal materials, stone, cloth, carpet, wood, and cork.

Here, the substrate includes a first plastic composite substrate layer 221 and a second plastic composite substrate layer 222. The substrate is extruded with first plastic composite substrate layer 221 and second plastic composite substrate layer 222.

The two plastic composite substrate layers 221, 222 are both blended and extruded from the mixture containing PVC powder, coarse whiting and light calcium compound powder, stabilizer, PE wax, internal lubricant, plasticizer, and impact modifier. In some aspects, it may be advantageous to use two or more layers of plastic composite substrates, in order to allow the two layers to have different physical properties. These various materials may be blended together into a mixture or compound, and that mixture may be extruded using various tools, such as a three-roll calendar.

For example, first plastic composite substrate layer 221 of plastic composite substrate may have higher requirements on hardness and resistance to impact. This requirement may be met by constructing the layer from a slightly different mixture, such as increasing a ratio of coarse whiting in the plastic composite base material formula and decreasing a ratio of PVC powder and light calcium. Second plastic composite substrate layer 222 of plastic composite substrate may have lower requirements on hardness and resistance to impact than first plastic composite substrate layer 221. In second plastic composite substrate layer 222, the mixture may have an increased ratio of PVC powder and light calcium, and a decreased ratio of coarse whiting in the plastic composite base material formula. Second plastic composite substrate layer 222 may also add a foaming agent.

First plastic composite substrate layer 221 and second plastic composite substrate layer 222 may be produced using a double inlet to send different plastic composite base material mixtures into an extruder. The compounded two-layered structure, plastic composite substrate layers 221, 222 may be extruded by an extruder with the same extrusion mold. The two plastic composite substrate layers 221, 222 may be thermally compressed and fused with surface layer 201 without the use of adhesives, and instead using pressure and temperature to fuse the layers together. The composite material of the two plastic composite substrate layers 221, 222 may be formed in a single step, which may allow for continuous automated production. Where second plastic composite substrate layer 222 uses a foam structure, with an added foaming agent, second plastic composite substrate layer 222 may use fewer raw materials in production, which may result in a more economical production cost.

As shown in FIG. 2, a plank may have multiple layers below the surface layer. Each of these layers may be constructed using different materials, and may have different purposes. For example, one or more substrate layers may be used as a wear layer. Such a layer may use HDPC core technology, and may be created from powder just before the time that the layers are fused together. Accordingly, the wear layer may still be hot just after its formation, and may be fused with other layers while the wear layer is still hot. A wear layer over a surface layer provides protection against physical abuse, such as where the surface layer cannot directly sustain against walking, furniture, etc. Different wear layers add different levels of protection.

The layer below the surface and substrate of a plank is sometimes referred to as the backer layer, which can be an anti-slip backing layer, in some cases. This backer layer may be placed on the other side of the substrate from the surface layer, such that the anti-slip backing layer would be in direct contact with the floor under the plank when installed. The anti-slip backing layer may be constructed from a softened extruded PVC layer. One function of the backing layer is to enhance sound properties (sound transmission and reflective sound) as well as anti-slip properties to ensure that the plank remains stable and attached to the floor underneath it while in use.

Figure 3:
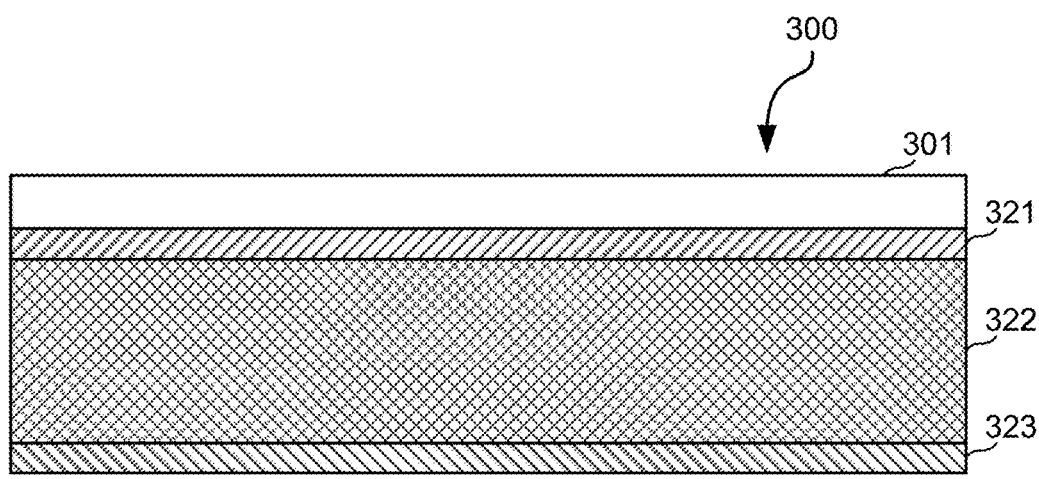
FIG. 3 is another diagram of a structure of an engineered plank.

FIG. 3 illustrates an exemplary plank 300 according to some aspects of the present disclosure, using a three-layer substrate. In this plank 300, a surface layer 301 and the layers of the substrate 321, 322, 323 are attached to one another using thermal compression. The substrate may be extruded and compounded by three layers of plastic composite substrates 321, 322, 323. The three layers of plastic composite substrates 321, 322, 323 may be extruded and compounded by a mixture containing one or more of PVC powder, coarse whiting and light calcium compound powder, stabilizer, PE wax, internal lubricant, plasticizer, and impact modifier.

The different layers of the substrate 321, 322, 323 may have different compositions, in order to allow plank 300 to have desirable characteristics and physical properties. For example, second layer 322 may have lower requirements on hardness and resistance to impact. This may allow the use of an increased ratio of PVC powder and light calcium, and a decreased ratio of coarse whiting. A foaming agent may also be used in second layer 322, which may allow for less material to be in second layer 322, which may reduce production costs. First layer 321 and third layer 323 may have higher requirements with regards to hardness and resistance to impacts, and so these layers 321, 323 may be constructed using a higher ratio of coarse whiting in the plastic composite base material formula and a lower ratio of PVC powder and light calcium. First layer 321 and third layer 323 can be made of the identical material or could be made of different materials.

The three-layer 321, 322, 323 substrate may be produced in a number of manners. One technique for producing such a substrate includes using triple inlets to send different plastic composite base material mixtures into the extruder. This three-layer 321, 322, 323 substrate may be extruded using an extruder with the same mold as other substrates, and is then thermally compressed with surface layer 301, as described above. The substrate is formed in a single process, allowing for continuous production in an automated manner.

Plank 300 may have advantages over plank 200, due to having an additional layer. For example, plank 300 may be harder and more resistant to impact than plank 200. For example, one plank produced using the structure of plank 300 was found to have a static bending intensity of 32 MPa, and elastic modulus of 1780 MPa, an impact strength of 160 kJ/m$^2$, and a contraction deformation rate of 0.25%. In a 4-hour "dipping detachment" test, where a sample of the plank is placed in 63° C. water for four hours and then placed ice at −20° C. for four hours, and showed no signs of stratification. Further, this plank had a formaldehyde content of 0 PPM in testing.

The flooring plank described herein provides significant improvement in dimensional stability over a range of temperatures, including minimal thermal expansion and contraction and minimal residual shape distortion after being subjected to temperature transient. An exemplary flooring plank will now be explained in connection with the following examples. The exemplary flooring plank was formed from a mixture of: (i) polyvinyl chloride (PVC) powder of about 19% to about 21% by weight, (ii) reclaimed plank material of about 14% to about 18% by weight, (iii) coarse calcium carbonate of about 56% to about 62% by weight, (iv) a stabilizer of about 1.9% to about 2.5% by weight, (v) an external lubricant of about 0.12% to about 0.15% by weight, (vi) an internal lubricant of about 0.15% to about 0.30% by weight, (vii) a plasticizer of about 0.12% to about 0.15% by weight, and (viii) impact modifier of about 2.0% to about 2.5%. The cold mix temperature was between 40° C. and 45° C. The hot mix temperature was between 130° C.–135° C.

The mixture was then extruded using a three roll calendar, where the rolls were maintained at a temperature of between 165° C.–180° C. The surface layer and wear layer were pressed and fused onto extruded plank at a temperature of 150° to 200°. The density of the resultant plank was about 1.995 tonne/m$^3$.

Commercially available flooring products were obtained and tested in comparison to the exemplary flooring plank described above, "Test piece 1". The comparable flooring products were: (i) Test piece 2: Allure™ Isocore™ provided by Tower IPCO Company Ltd, of Dublin, Ireland; (ii) Test piece 3: Mohawk™ Solid Tech™ provided by Mohawk Industries, Inc. of Calhoun, Ga.; and (iii) Test piece 4: Armstong™ Luxe Plank™ provided by Armstrong Hardwood Flooring Company of Lancaster, Pa. For Examples 1-2 below, the nominal test specimen size was about 140 mm×140 mm, and the nominal test sample thickness varied depending upon the test piece. Test piece 1 had a thickness of about 5.42 mm. Test piece 2 (Allure™ Isocore™) had a thickness of about 6.15 mm. Test piece 3 (Mohawk™ Solid Tech™) had a thickness of about 5.70 mm. Test piece 4 (Armstong™ Luxe Plank™ had a thickness of about 6.74 mm.

Example 1

The test pieces were compared for dimensional changes at lower temperatures. The test pieces were first conditioned at a laboratory environment at a temperature of about 60° F. and relative humidity of 50% for 24 hours. The test pieces were then measured and the measurements recorded. The test pieces were then subjected to a second, depressed temperature environment in a freezer in an air environment at a temperature of about −5° F. for 24 hours. The temperature was verified using a hanging freezer thermometer and a generic laser thermometer. The test specimens were removed from the second environment, and then immediately re-measured. The dimensional differences are shown below.

| Test Specimen | Test Mode | L: 1 | W: 1 | L: 2 | W: 2 | Decrease Change (%) |
|---|---|---|---|---|---|---|
| Test Piece 1 | Conditioned | 140.46 | 140.43 | 140.55 | 140.23 | N/A |
|  | −5° F. | 140.37 | 140.35 | 140.43 | 140.17 | .032% |
| Test Piece 2 Allure™ Isocore™ | Conditioned | 140.46 | 140.50 | 140.54 | 140.1 | N/A |
|  | −5° F. | 140.29 | 140.35 | 140.37 | 140.29 | .107% |
| Test Piece 3 Mohawk™ SolidTech™ | Conditioned | 140.49 | 140.41 | 140.46 | 140.30 | N/A |
|  | −5° F. | 140.34 | 140.28 | 140.32 | 140.20 | .093% |
| Test Piece 4 Armstrong™ Luxe Plank™ | Conditioned | 140.38 | 140.37 | 140.47 | 140.28 | N/A |
|  | −5° F. | 140.11 | 140.13 | 140.23 | 140.11 | .164% |

As shown above, Test Piece 1 exhibited the lowest percentage change in dimension after being subjected to the first laboratory environment and then the second lowered temperature environment.

Example 2

The test pieces were compared for resistance to extreme elevated temperatures. Specimens were first conditioned at the laboratory environment of a temperature of about 60° F. and relative humidity of 50% for 24 hours. The test pieces were then measured and the measurements recorded. The test pieces were then subjected to an extreme elevated temperature environment in a test oven. The test oven was first preheated to a temperature of about 200° F. in an air environment. The samples were then placed in the test oven at about 200° F. for one hour. The temperature was verified using a generic laser thermometer on internal surfaces of the oven. The test specimens were then removed from the second environment, and then immediately re-measured. The dimensional differences are shown below.

| Test Specimen | Test Mode | L: 1 | W: 1 | L: 2 | W: 2 | Decrease Change (%) |
|---|---|---|---|---|---|---|
| Test Piece 1 | Conditioned | 140.02 | 140.00 | 139.92 | 140.15 | N/A |
|  | 200° F. | 139.85 | 140.05 | 139.73 | 140.20 | −.045% |
| Test Piece 2 Allure™ Isocore™ | Conditioned | 140.52 | 140.45 | 140.41 | 140.53 | N/A |
|  | 200° F. | 141.05 | * | 140.99 | * | .395% |
| Test Piece 3 Mohawk™ SolidTech™ | Conditioned | 140.24 | 140.33 | 140.35 | 140.21 | N/A |
|  | 200° F. | 140.70 | 140.67 | 140.81 | 140.66 | .305% |
| Test Piece 4 Armstrong™ Luxe Plank™ | Conditioned | 139.52 | 139.43 | 139.43 | 139.46 | N/A |
|  | 200° F. | 140.16 | * | 140.45 | * | .595% |

* not measured because of distortion

As shown above, Test Piece 1 exhibited the lowest percentage change in dimension after being subjected to the first laboratory environment and then the second elevated temperature environment.

In addition, Test Piece 1 exhibited very low deviation from flatness after being subjected to the first laboratory environment and then the second elevated 200° F. temperature environment. A chart of the flatness results is shown below.

| Test Specimen | Shape | X Dir. Max. Dev. | X Dir. Max. Dev. | X Dir. Diff. | Y Dir. Max. Dev. | Y Dir. Max. Dev. | Y Dir. Diff. |
|---|---|---|---|---|---|---|---|
| Test Piece 1 | Flat | .2134 | .2288 | .015 | .2081 | .2135 | .005 |
| Test Piece 2 Allure™ Isocore™ | Convex | .7376 | .7978 | .060 | .2209 | .7378 | .517 |
| Test Piece 3 Mohawk™ SolidTech™ | Concave | .2131 | .2647 | .052 | .2154 | .2660 | .051 |
| Test Piece 4 Armstrong™ Luxe Plank™ | Convex | .5806 | .5986 | .018 | .2624 | .5777 | .315 |

In particular, as to Test Piece 1, at least one of top and bottom surfaces of the plank had an unweighted maximum surface flatness deviation of no greater than 0.015 over the 140 mm top surface of the sample or about 0.003 inches per inch of surface. As to Test Piece 2, the unweighted maximum surface flatness deviation was about 0.517 inches over the 140 mm top surface of the sample or about 0.094 inches per inch of top surface. As to Test Piece 3, the unweighted maximum surface flatness deviation was about 0.052 inches over the 140 mm top surface of the sample or about 0.009 inches per inch of top surface. As to Test Piece 4, the unweighted maximum surface flatness deviation was about 0.315 inches over the 140 mm top surface of the sample or about 0.057 inches per inch of top surface.

FIGS. 8-11 show diagrams of flatness for each sample in a topographical format. FIGS. 12-15 show cross sectional diagrams of the flatness for each sample. The flatness was measured with the test sample un-fixtured (i.e., freestanding) relative to the reference surface and without weight applied.

Example 3

Tensile test—A test sample of each material was formed in a 40 mm×40 mm blank. The thickness of each test sample was dependent upon the material tested. Test piece 1 had a thickness of about 5.42 mm. Test piece 2 (Allure™ Isocore™) had a thickness of about 6.15 mm. Test piece 3 (Mohawk™ Solid Tech™) had a thickness of about 5.70 mm. Test piece 4 (Armstong™ Luxe Plank™ had a thickness of about 6.74 mm. The test samples were conditioned in a laboratory environment at a temperature of about 68° F. and a relative humidity of 52% for 24 hours. The specimens were subjected to a force applied to the top surface with the bottom surface fixed in the test stand. The force at which each sample yielded is shown in the chart below along with a corresponding tensile strength.

| Test Specimen | Yield Tensile Force (lbs) | Yield Tensile Strength (psi) |
| --- | --- | --- |
| Test Piece 1 | 1075 | 433.5 |
| Test Piece 2 Allure ™ Isocore ™ | 125 | 50.4 |
| Test Piece 3 Mohawk ™ SolidTech ™ | 1025 | 413.3 |
| Test Piece 4 Armstrong ™ Luxe Plank ™ | 225 | 90.7 |

Test Piece 1 exhibited the highest yield strength.

Example 5

The density of the test pieces is shown below.

| Test Specimen | Density |
| --- | --- |
| Test Piece 1 | 1.995 tonne/m3 |
| Test Piece 2 Allure ™ Isocore ™ | 1.335 tonne/m3 |
| Test Piece 3 Mohawk ™ SolidTech ™ | 1.324 tonne/m3 |
| Test Piece 4 Armstrong ™ Luxe Plank ™ | 1.105 tonne/m3 |

As shown above, Test Piece 1 had the highest density.

In other variations, the surface layer might have a thicker wear layer that would sit over the HDPC core substrate and the HDPC core substrate would have a softer PVC backing to provide for comfort and anti-slip. In such cases, the thicker wear layer can be part of the surface layer or the substrate. Typically, the wear layer can be part of the surface layer. A wear layer might be clear, covering a decorative veneer surface layer and simultaneously fused together on the HDPC core substrate.

In this manner, multiple layers can be fused and those layers might include a surface layer, a wear layer (which might be HDPC and created from powder just before the time of the fusing), and an anti-slip backing layer (if used). This bonding process is done by fusing the layers all together while the wear layer is hot just after extrusion or during extrusion.

Figure 4:
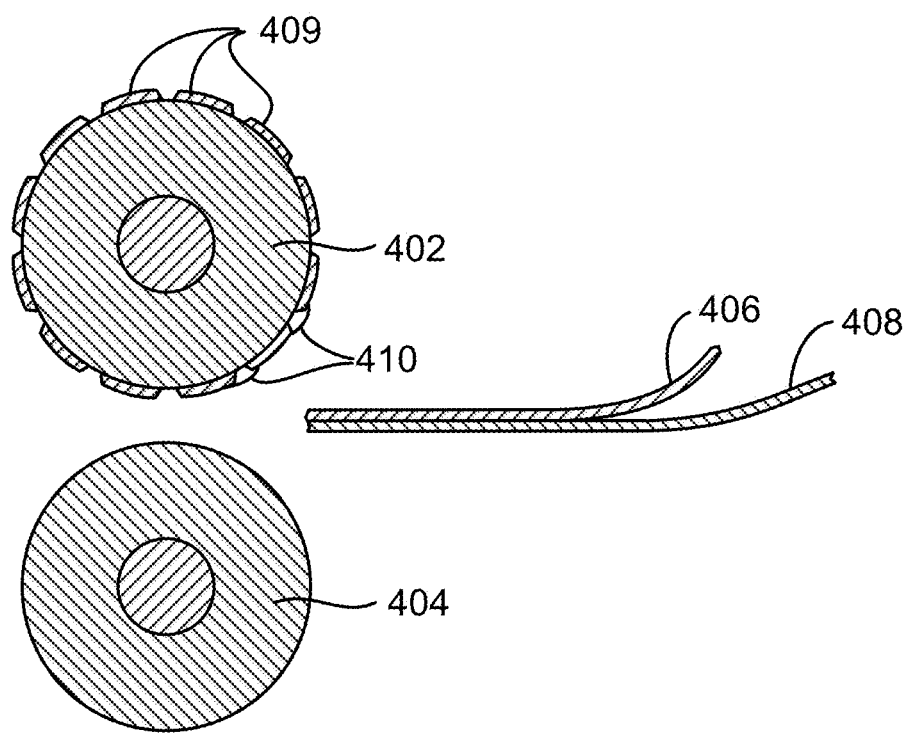
FIG. 4 is a diagram illustrating a process for embossing in registration as part of an extrusion process.

FIG. 4 is a diagram illustrating a process for embossing in registration (EIR) as part of an extrusion process. As a result of the EIR process, the planks will have an embossed pattern rather than being flat on the exposed surface of the plank. The embossed pattern preferably corresponds to the visual pattern of a paper layer that is part of the surface layer.

While unregistered embossing might be used, such as where there is no particular visual pattern in the surface layer but a completely smooth wear layer is not desired, a pattern could be embossed onto the planks at an arbitrary position. In preferred embodiments, the texture that is applied aligns with a print pattern of the surface layer. In some cases, the texture preferably aligns to the print pattern within a strict tolerance of less than 1 mm.

In order to ensure that the embossed pattern aligns with the visual pattern, the speed of the roller that does the embossing is variably controlled based on sensors that detect the rate that the substrate is created, possibly by monitoring the rate of uptake of the surface layer. In this manner, the surface layer is embossed in registration with the visual pattern of the surface layer. Alternatively, the rotation rate of the embossing roller is varied to match the pressure being applied by the vinyl material, which also can correspond to the rate at which the extrusion is occurring.

As shown in FIG. 4, a roller 402 provides the embossing when materials are extruded between roller 402 and another roller 404. Although not shown, roller 404 might provide an anti-slip embossing on the lower side of the plank which also gives better sound characteristics, but that does not necessarily require any particular alignment. Rollers 402 and 404 would cause a surface layer 406 to be bonded to a substrate 408 at some high temperature, while also embossing surface layer 406. The embossing is provided by a raised or carved pattern on roller 402 formed by structures 409. Structures 410 behind structures 409 illustrate that the pattern can go across roller 402. A motor (not shown) controlling the rotation of roller 402 would preferably be timed with the uptake of surface layer 406 so that structures 409, 410 correspond to visual patterns on a printed paper portion of surface layer 406.

Conventional methods might use manual visual alignment to align a separate plate above a paper layer having a pattern thereon and aligning marks from the textured plate with marks on the paper. This can be difficult, slow, and time consuming and involve considerable waste where the alignment is off by human error or otherwise. With the approach here, the process is fast and accurate and needs minimal manual intervention and limits waste.

Figure 5:
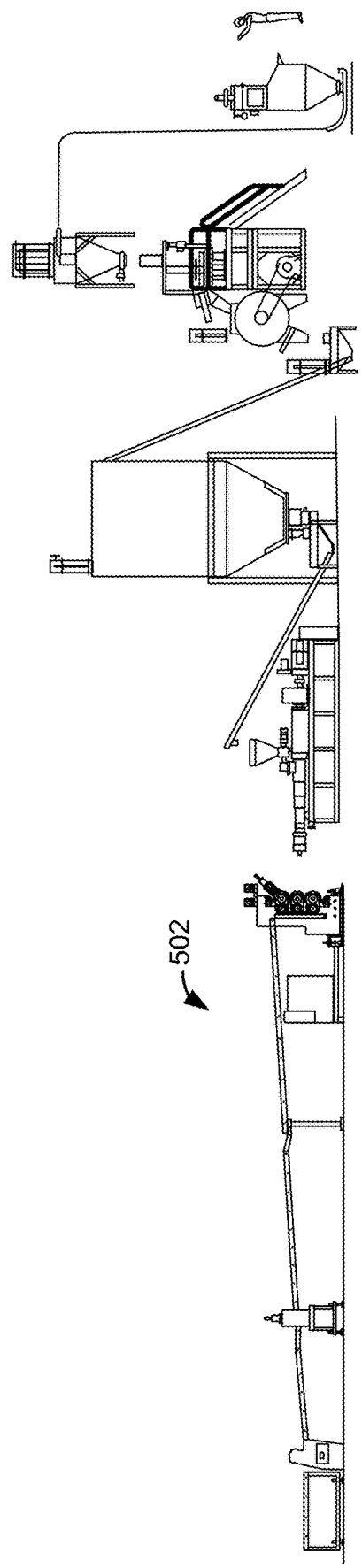
FIG. 5 is a schematic diagram of a production system for manufacturing the engineered planks.

FIG. 5 is a schematic diagram of a production system for manufacturing the engineered planks. As illustrated there, materials are mixed at the right and heated to various extents, including a hot mix and a cold mix. The substrate materials can then be output by a panel mould to a set of rollers 502.

Figure 6A:
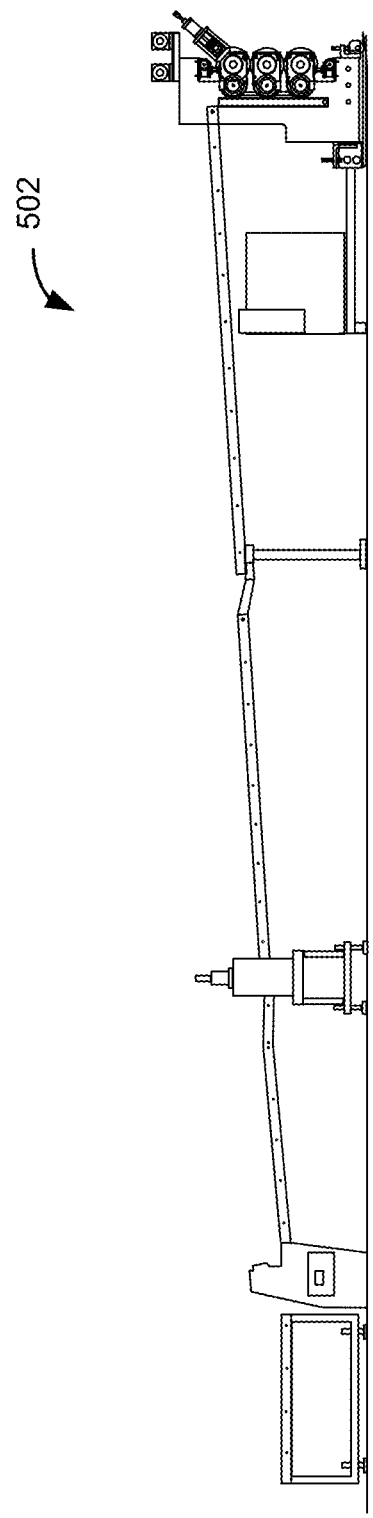
FIGS. 6A and 6B illustrate elements of FIG. 5 in expanded views.
Figure 6B:
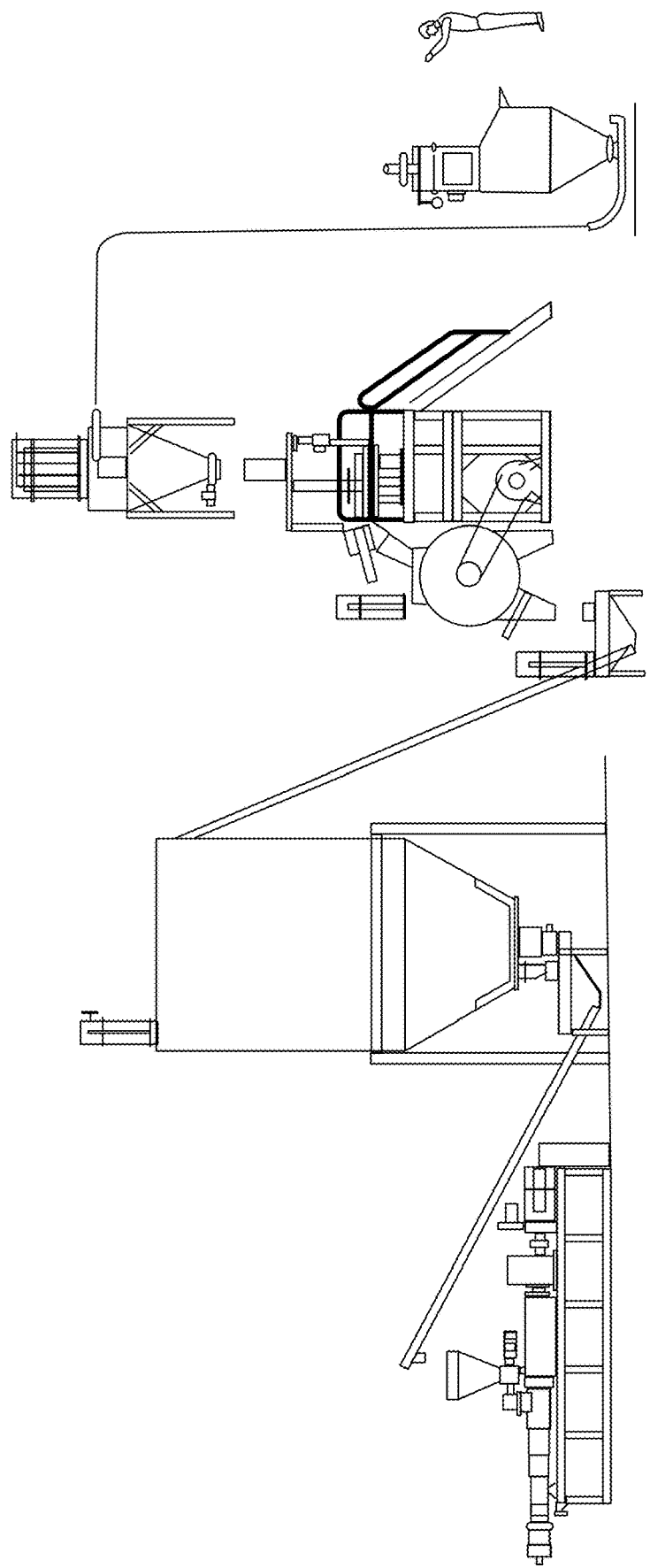

FIGS. 6A and 6B illustrate elements of FIG. 5 in expanded views.

Figure 7:
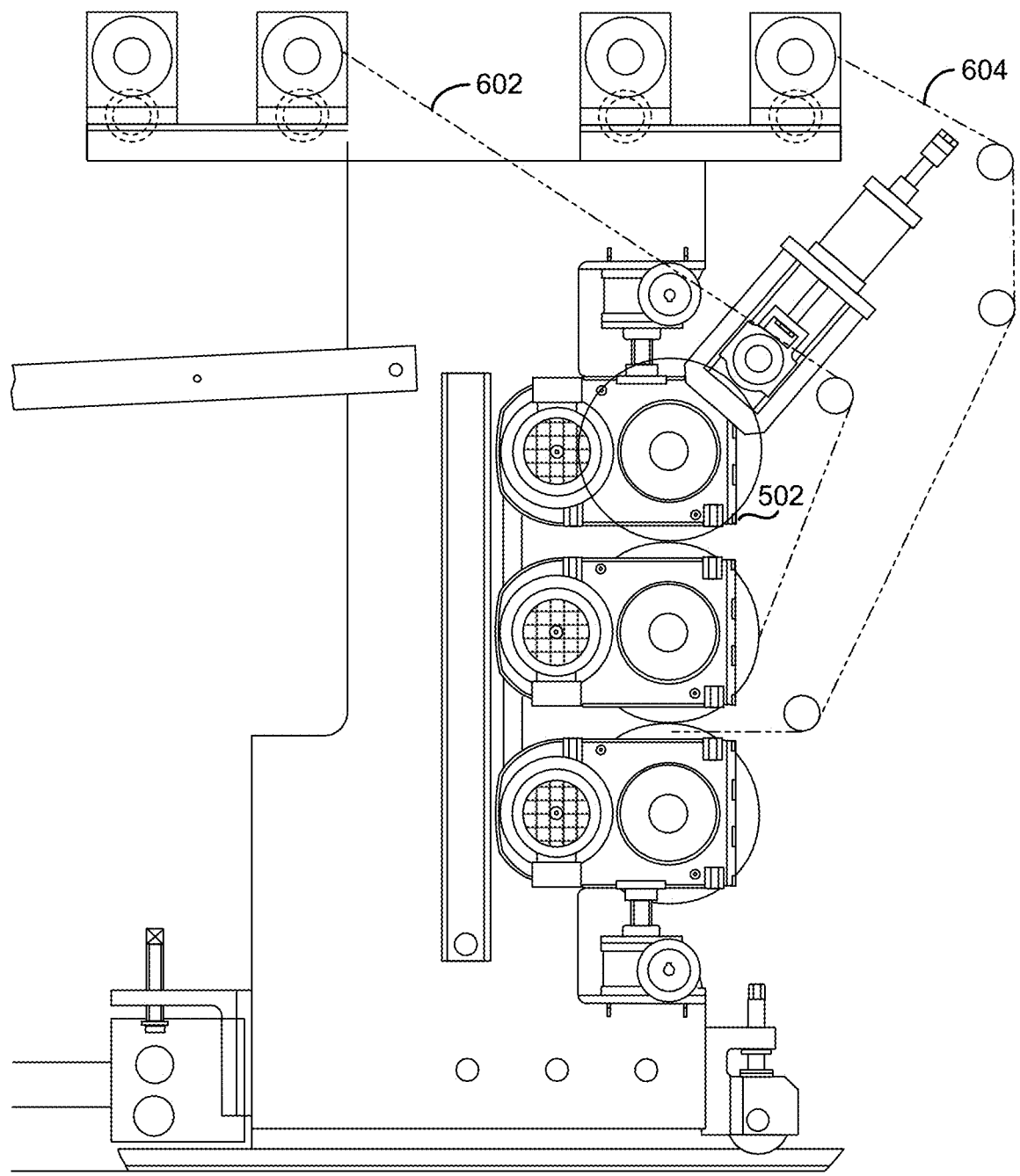
FIG. 7 is a schematic diagram of a roller system of the production system of FIG. 5 shown in greater detail.

FIG. 7 shows the rollers of FIG. 5 in greater detail. As shown there, there are three rollers that are maintained at particular temperatures (130° C., 120° C., and 110° C., respectively). Between the second and third rollers, the surface layer is pressed into the substrate. The embossing might be done at the second roller. The surface layer in this example comprises a wear layer 602 and a color printed paper layer 604. Note that these both go into the roller system, between the first and second rollers, along with the substrate. They then continue between the second and third rollers accordingly.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

The specification and drawings are to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. An engineered plank comprising:
a surface layer, and
a plastic composite base material layer joined to the surface layer without the use of intermediate adhesive materials with the surface layer forming a top surface of the plank and the plastic composite base material layer forming a bottom surface of the plank; and
wherein the plank is configured such that at least one of the top and bottom surfaces has an unweighted maximum surface flatness deviation of no greater than 0.005 inches per inch of the at least one of the top and bottom surfaces after being subjected to a test A, wherein the test A comprises: (i) subjecting the plank to a first air environment at 60 degrees F. for a first period of 24 hours; (ii) immediately upon the expiration of the first period, subjecting the plank to a second air environment at 200 degrees F. for a second period of 1 hour; (iii) immediately upon expiration of the second period, measuring the plank; and
wherein the plastic composite base material layer comprises an extrusion of a mixture of polyvinyl chloride powder, coarse whiting powder, stabilizer, lubricant, plasticizer, and impact modifier, the mixture being a resultant of at least one of a cold mixing process and a hot mixing process;
wherein the extrusion comprises a first extruded substrate layer, a second extruded substrate layer and a third extruded substrate layer, the second extruded substrate layer being located between and in direct contact with the first and third extruded substrate layers, the second extruded substrate layer having different physical properties than the first and third extruded substrate layers, at least one of the first extruded substrate layer and third extruded substrate layer having higher hardness than the second extruded substrate layer, the first extruded substrate layer of the plastic composite base being joined to the surface layer.

2. The engineered plank of claim 1, wherein the plank is configured such that length and width dimensional changes of the plank are no greater than 0.05% when subjected to a test B; wherein the test B comprises: (i) subjecting the plank to the first air environment at 60 degrees F. for a first period of 24 hours; (ii) immediately upon the expiration of the first period, subjecting the plank to a second air environment at −5 degrees F. for a second period of 24 hours; and (iii) upon expiration of the second period, immediately measuring the plank.

3. The engineered plank of claim 1, wherein when the plank is subjected to the test A, length and width dimensional changes of the plank are no greater than 0.050%.

4. The engineered plank of claim 1, wherein the surface layer comprises at least one of ceramic, tile, glass, rubber, plastic, paper, leather, metals, stone, cloth, carpet, and cork.

5. The engineered plank of claim 1, wherein the density of the plank is between about 1.1 tonnes per cubic meter and about 2.1 tonnes per cubic meter.

6. The engineered plank of claim 5, wherein the density of the plank is between about 1.7 tonnes per cubic meter and about 2.1 tonnes per cubic meter.

7. The engineered plank of claim 6, wherein the density of the plank is between about 1.9 tonnes per cubic meter and about 2.1 tonnes per cubic meter.

8. The engineering plank of claim 1, wherein the plank is configured such that at least one of the top and bottom surfaces has an unweighted maximum surface flatness deviation of no greater than 0.003 inches per inch of the at least one top and bottom surfaces when subjected to the test A.

9. The engineering plank of claim 1, wherein the plank is configured such that both the top and bottom surfaces of the plank have an unweighted maximum surface flatness deviation of no greater than 0.003 inches per inch of the top and the bottom surfaces when subjected to the test A.

10. The engineering plank of claim 1, wherein the plank is configured such that both the top and bottom surfaces of the plank have an unweighted maximum surface flatness deviation of no greater than 0.005 inches per inch of the top and the bottom surfaces when subjected to the test A.

11. The engineering plank of claim 1, wherein the plank has a tensile strength as measured between the top and bottom surfaces of greater than 420 psi.

12. The engineered plank of claim 1, wherein the plank has a tensile strength as measured across the surface layer and the plastic composite base layer of greater than 430 psi.

13. The engineered plank of claim 1, wherein:
the mixture is a resultant of both the cold mixing process and the hot mixing process, the cold mixing process being conducted at a temperature less than a temperature of the hot mixing process;

a first subset of the polyvinyl chloride powder, coarse whiting powder, stabilizer, lubricant, plasticizer, and impact modifier is mixed via the cold mixing process; and a second subset of the polyvinyl chloride powder, coarse whiting powder, stabilizer, lubricant, plasticizer, and impact modifier is mixed via the hot mixing process, the second subset being different than the first subset.

14. An engineered plank comprising:

a surface layer, and a plastic composite base material layer joined to the surface layer without the use of intermediate adhesive materials;

wherein the plank has a tensile strength as measured across the surface layer and the plastic composite base material layer of greater than 420 psi; and wherein the plastic composite base material layer comprises an extrusion of a mixture of polyvinyl chloride powder, coarse whiting powder, stabilizer, lubricant, plasticizer, and impact modifier, the mixture being a resultant of at least one of a cold mixing process and a hot mixing process;

wherein the extrusion comprises a first extruded substrate layer, a second extruded substrate layer and a third extruded substrate layer, the second extruded substrate layer being located between and in direct contact with the first and third extruded substrate layers, the second extruded substrate layer having different physical properties than the first and third extruded substrate layers, at least one of the first extruded substrate layer and third extruded substrate layer having higher hardness than the second extruded substrate layer, the first extruded substrate layer of the plastic composite base being joined to the surface layer.

15. The engineered plank of claim 14, wherein the surface layer comprises at least one of ceramic, tile, glass, rubber, plastic, paper, leather, metals, stone, cloth, carpet, and cork.

16. The engineered plank of claim 14, wherein the density of the plank is between about 1.1 tonnes per cubic meter and about 2.1 tonnes per cubic meter.

17. The engineered plank of claim 16, wherein the density of the plank is between about 1.7 tonnes per cubic meter and about 2.1 tonnes per cubic meter.

18. The engineered plank of claim 17, wherein the density of the plank is between about 1.9 tonnes per cubic meter and about 2.1 tonnes per cubic meter.

19. The engineered plank of claim 14, wherein the plank has a tensile strength as measured across the surface layer and the plastic composite base material layer of greater than 430 psi.

20. An engineered plank comprising:

a surface layer, and a plastic composite base material layer joined to the surface layer without the use of intermediate adhesive materials with the surface layer forming a top surface of the plank and the plastic composite base material layer forming a bottom surface of the plank; and wherein the plank is configured such that length and width dimensional changes of the plank are no greater than 0.05% after being subjected to a test C, wherein the test C comprises: (i) subjecting the plank to a first air environment at 60 degrees F. for a first period of 24 hours; (ii) immediately upon the expiration of the first period, subjecting the plank to a second air environment at 200 degrees F. for a second period of 1 hour; (iii) immediately upon expiration of the second period, measuring the plank; and wherein the plastic composite base material layer comprises an extrusion of a mixture of polyvinyl chloride powder, coarse whiting powder, stabilizer, lubricant, plasticizer, and impact modifier, the mixture being a resultant of at least one of a cold mixing process and a hot mixing process;

wherein the extrusion comprises a first extruded substrate layer, a second extruded substrate layer and a third extruded substrate layer, the second extruded substrate layer being located between and in direct contact with the first and third extruded substrate layers, the second extruded substrate layer having different physical properties than the first and third extruded substrate layers, at least one of the first extruded substrate layer and third extruded substrate layer having higher hardness than the second extruded substrate layer, the first extruded substrate layer of the plastic composite base being joined to the surface layer.

\* \* \* \* \*

UNITED STATES PATENT AND TRADEMARK OFFICE
CERTIFICATE OF CORRECTION

PATENT NO. : 10,974,488 B2  
APPLICATION NO. : 15/596175  
DATED : April 13, 2021  
INVENTOR(S) : Ming Chen and Zhu Chen Page 1 of 1

It is certified that error appears in the above-identified patent and that said Letters Patent is hereby corrected as shown below:

On the Title Page  
In the Foreign Application Priority Data Item (30), add:  
--Dec. 9, 2015 (CN) .......................... 201510916246.8--

Signed and Sealed this  
Tenth Day of June, 2025

Coke Morgan Stewart  
*Acting Director of the United States Patent and Trademark Office*